(12) United States Patent
Jain et al.

(10) Patent No.: US 9,779,141 B2
(45) Date of Patent: Oct. 3, 2017

(54) QUERY TECHNIQUES AND RANKING RESULTS FOR KNOWLEDGE-BASED MATCHING

(71) Applicant: Microsoft Technology Licensing, LLC, Redmond, WA (US)

(72) Inventors: Navendu Jain, Seattle, WA (US); Luhui Hu, Bellevue, WA (US); Liyuan Zhang, Redmond, WA (US); Rahul Potharaju, West Lafayette, IN (US); Vitaly Voloshin, Sammamish, WA (US); Mingshi Wang, Bellevue, WA (US); Joseph K. W. Chan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 847 days.

(21) Appl. No.: 14/106,763

(22) Filed: Dec. 14, 2013

(65) Prior Publication Data
US 2015/0169582 A1 Jun. 18, 2015

(51) Int. Cl.
*G06F 17/30* (2006.01)

(52) U.S. Cl.
CPC ...... *G06F 17/3053* (2013.01); *G06F 17/3066* (2013.01); *G06F 17/30542* (2013.01); *G06F 17/30699* (2013.01)

(58) Field of Classification Search
CPC ........... G06F 17/3053; G06F 17/30542; G06F 17/30699; G06F 17/30646; G06F 17/30386; G06F 17/30554; G06F 17/30645; G06F 17/30392

USPC .................................................. 707/736, 748
See application file for complete search history.

(56) References Cited

U.S. PATENT DOCUMENTS

| | | | |
|---|---|---|---|
| 6,374,241 B1 * | 4/2002 | Lamburt | G06Q 20/20 705/15 |
| 8,055,669 B1 | 11/2011 | Singhal et al. | |
| 2003/0225756 A1 * | 12/2003 | Liu | G06F 3/0236 |
| 2005/0071333 A1 * | 3/2005 | Mayfield | G06F 17/30731 |
| 2006/0089926 A1 * | 4/2006 | Knepper | G06F 17/30616 |
| 2007/0073651 A1 | 3/2007 | Imielinski | |
| 2007/0156677 A1 * | 7/2007 | Szabo | G06F 17/30522 |
| 2008/0208820 A1 | 8/2008 | Usey | |
| 2008/0263032 A1 | 10/2008 | Vailaya et al. | |

(Continued)

OTHER PUBLICATIONS

Woods, "Conceptual Indexing: A Better Way to Organize Knowledge", Sun Microsystems Lab., 99 pages, Apr. 1997.

(Continued)

*Primary Examiner* — James Trujillo
*Assistant Examiner* — Fariborz Khoshnoodi
(74) *Attorney, Agent, or Firm* — Workman Nydegger

(57) ABSTRACT

Disclosed herein is a system and method for searching or processing queries for searching for documents contained in a domain specific knowledge base. The system takes a query and generates from the query a modified version of the query by passing the query through one or more filters in a query processor. The query processor adds or removes terms from the query. The query processor can add or recognize that two words that appear to be separate words actually identify a specific software entity or can determine that a number appearing in a query is not just a number but refers to a specific version or a number relevant to the specific problem.

20 Claims, 6 Drawing Sheets

(56) References Cited

U.S. PATENT DOCUMENTS

| | | | | |
|---|---|---|---|---|
| 2008/0288266 | A1* | 11/2008 | Diao | G06Q 10/10 705/1.1 |
| 2009/0006619 | A1* | 1/2009 | Mohammed | G06F 11/1458 709/225 |
| 2009/0306962 | A1* | 12/2009 | Harlow | G06F 17/277 704/9 |
| 2011/0270883 | A1 | 11/2011 | Bukai et al. | |
| 2012/0005219 | A1 | 1/2012 | Apacible et al. | |
| 2012/0077178 | A1 | 3/2012 | Bagchi et al. | |
| 2015/0169734 | A1 | 6/2015 | Jain et al. | |

OTHER PUBLICATIONS

"International Preliminary Report on Patentability Issued in PCT Application No. PCT/US2014/069173", dated Apr. 13, 2016, 9 pages.

"International Search Report and Written Opinion Issued in PCT Patent Application No. PCT/US2014/069173", dated Apr. 9, 2015, 14 pages.

"Second Written Opinion Issued in PCT Application No. PCT/US2014/069173", dated Jan. 8, 2016, 8 Pages.

Saha, et al., "Improving Bug Localization using Structured Information Retrieval", In IEEE/ACM 28th International Conference on Automated Software Engineering, Nov. 11, 2013, 10 pages.

Office Action dated May 6, 2016 cited in U.S. Appl. No. 14/106,762.

"International Preliminary Report on Patentability Issued in PCT Application No. PCT/US2014/069174", dated Mar. 11, 2016, 7 Pages.

"International Search Report and Written Opinion Issued in PCT Application No. PCT/US2014/069174", dated Mar. 25, 2015, 10 Pages.

"Second Written Opinion Issued in PCT Application No. PCT/US2014/069174", dated Nov. 12, 2015, 6 Pages.

Meng, et al., "Building Efficient and Effective Metasearch Engines", In Journal of ACM Computing Surveys, vol. 34 Issue 1, Mar. 1, 2002, pp. 49-89.

Office Action dated Nov. 4, 2016 cited in U.S. Appl. No. 14/106,762.

Notice of Allowance dated Feb. 22, 2017 cited in U.S. Appl. No. 14/106,762.

* cited by examiner

QUERY TECHNIQUES AND RANKING RESULTS FOR KNOWLEDGE-BASED MATCHING

TECHNICAL FIELD

This description relates generally to generation of modified queries for knowledge based searching and matching of documents.

BACKGROUND

Consumers of software applications typically have problems associated with the software come up. These problems range from configuration errors to system crashes. When the consumer encounters these type of problems they usually first try to find a solution to the problem by consulting with a search engine. The search engine aims to find relevant documents from an index that was created by crawling through web documents, discussion boards, email threads, software manuals and other publicly available documents. If the search engine does not provide adequate results the consumer will typically call a customer support service. When dealing with customer support, an customer support representative or engineer tries to match the reported problem with information contained in a knowledge base database e.g., by searching the database or using a classification schema. This approach allows the customer support staff to provide the user with the expert written facts and rules to solve the customer's problem.

However, the customer support service using humans is extremely costly for companies to provide. Second, this approach risks significant wait times when a large number of customers call the call center at once or within a short time window. This typically occurs, for example, when a new feature is released or a faulty software patch ends up causing new problems on the customer machine. Third, this approach to troubleshooting is dependent on the expert defined rules in the database that risk incompleteness or become outdated as the software evolves. Finally, this approach only solves the problem that is reported or presented by the customer to the customer support but does not identify other potentially related problems such as the need to apply a specific security patch.

Search engines such as Google and Bing have been optimized to output highly relevant results for a given query. However, their techniques focus on text-based matching of the query terms or its extensions such as spell correction or changing the order of terms to enable matching of relevant documents. This approach makes it difficult to correctly identify and analyze configuration errors based on the information contained in the articles (e.g., technical solutions) in the knowledge base. This is because these articles are written in natural language text, they are highly domain-specific, and they often use abbreviations and synonyms for technical words and also may describe conditional constraints on the configuration parameters and values in the specific documents that indicate configurations where the document is relevant and where it is not relevant. As such the problem or error reported/presented by the consumer may not be easily searchable in the knowledge base articles.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system and method for searching for documents contained in a domain-specific knowledge base. The system takes a query (e.g., a configuration snapshot of a software from a customer machine) as input and generates from the query a modified version of the query by passing the query through one or more filters in a query processor. The query processor adds, removes or modifies terms from the query. The query processor provides a broad range of functionalities. For instance, it can add or recognize that two words that appear to be separate words actually identify a specific software entity or it can determine that a number appearing in a query is not just a numeric value but that it refers to a specific version or a number relevant to the specific configuration problem.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
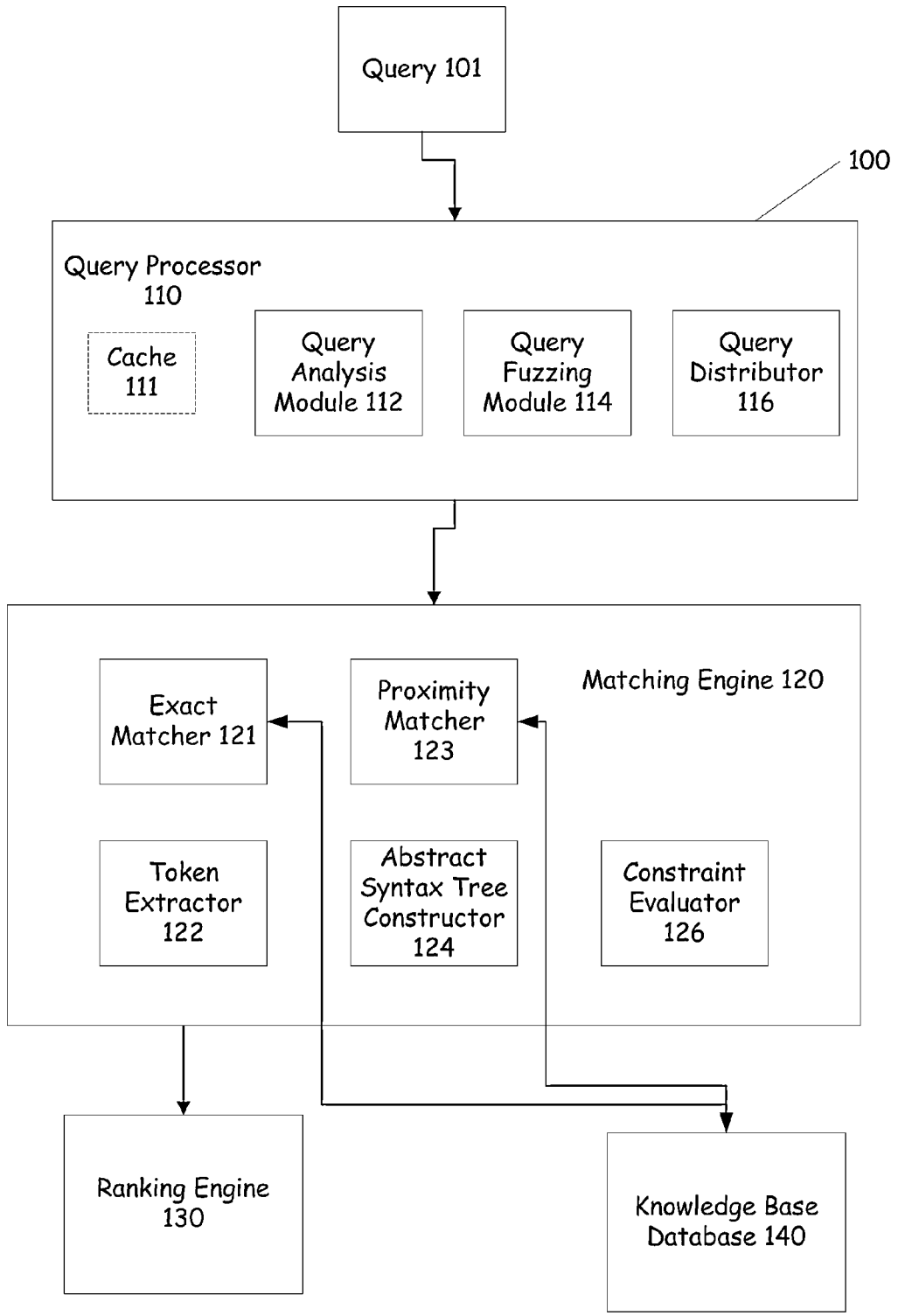
FIG. 1 is a block diagram illustrating components of the query processing system to one illustrative embodiment.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The present disclosure relates to query processing against a knowledge base of article, documents or other information types such as blogs, forums, configuration snapshots, and social media. It should be noted that while there is similarity between the type of query processing performed herein and generic search engines such as Bing, Google, etc. there are fundamental differences in the way they approach queries themselves and query processing. Specifically, the present discussion includes domain-specific logic and processes to analyze configuration and software errors not typically contemplated by generic search engines. For example the present disclosure fuzzes properties/terms in a query to find the closest matches to a specific value, breaks the input tokens in the string so as to differentiate the values and names contained therein as opposed to taking the entire input as a long string, and considers predicate statements (e.g., truth statements) in both the query and the documents or articles as opposed to simply ignoring or analyzing those concepts in a different way, therein.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or process in a distributed manner by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

FIG. 1 is a block diagram illustrating a query processing system 100 according to one illustrative embodiment. Query processing system 100 includes a query processor 110, a matching engine 120, a ranking engine 130 and a knowledge base database 140. It should be noted that the components of the query processing system 100 in some embodiments may reside on a single computing device while in other embodiments some or all of the components may reside on multiple different computing devices connected to each other such that they can work in cooperation with each other. In a distributed environment any one of the components of FIG. 1 may be distributed from any of the other components. Further, in the distributed environment the components may be present on different servers or virtual machines, where each of the different servers or virtual machines may execute one or more of the functions of the components.

Query processor 110 is configured to receive the input query 101 and convert the received query into a format that permits the query to be matched against documents stored in an enhanced index or other type of index in the knowledge base 140. Query 101 typically is a query that is directly input to the system 100 by a user by for example typing in a question into a search box. However, query 101 can include system data and operations data such as software configuration data typically represented as a list of key, value pairs, settings, alerts, events, diagnostics logs, error codes, performance data, configuration snapshots or any other data that may be reported out from a computing system. In order to ensure an accurate match of documents in the knowledge base 140 the query processor 110, in one illustrative embodiment, includes three components, a query analysis module 112, a query fuzzing module 114 and a query distributor module 116. In some embodiments the query processor 110 includes a cache 111 that holds in a cache previously received queries and results that may be returned in the event that the query matches a previous query.

Figure 2A:
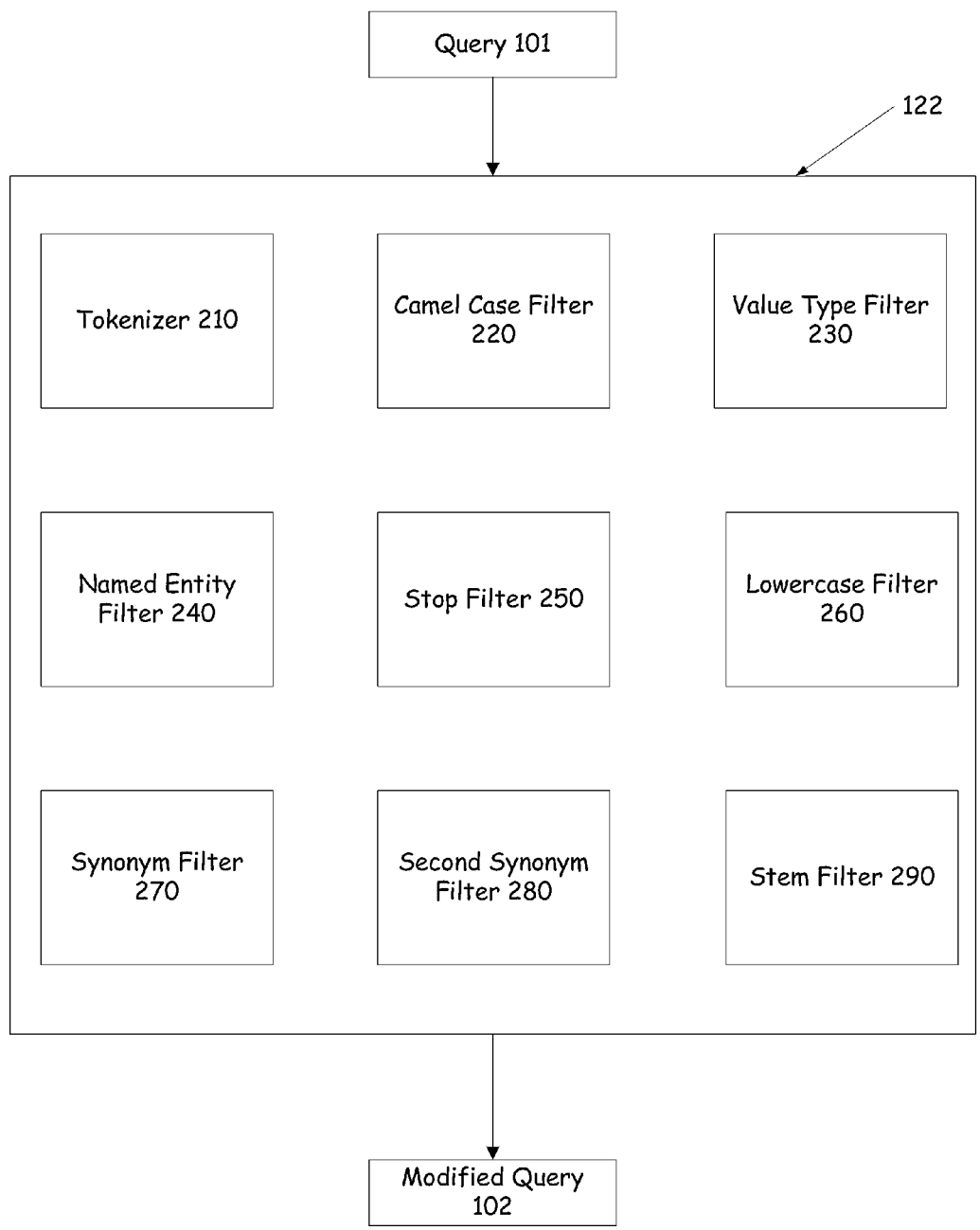
FIG. 2A is a block diagram illustrating query analysis component using a number of filters to generate the modified query according to one illustrative embodiment.

Query analysis module 112 is configured to prepare an abstract representation of the query. It does this by rewriting the query and substituting any value-types it finds (e.g., numbers like 7 or seven, Boolean words like true or false) with generics (e.g., NUMERIC and BOOLEAN, respectively) and stores the value separately for constraint evaluation by the Matching Engine 120. Query analysis module 112 is further configured to mimic the processing that happens on the input corpus during the index building phase disclosed in U.S. patent application Ser. No. 14/106,762 filed Dec. 14, 2013 entitled BUILDING FEATURES AND INDEXING FOR KNOWLEDGE-BASED MATCHING by Navendu Jain et al, the contents of which are hereby incorporated by reference in their entirety. FIG. 2 shows the various filters that process the input query. Depending on how the documents are indexed in the knowledge base 140 the input query may not pass through the expansion phase as synonyms may instead have been added to the index during the index building stage. It should be noted that various embodiments of the present disclosure may have different filters present and not all of the filters are required. A developer has the ability to pick and choose which of the filters illustrated in FIG. 2A are applicable or usable by the query processing system 100. As such any number or combinations of the filters may be present.

The query analysis module 112 passes the query 101 through a number of filters in order to generate the terms that will be used for querying the knowledge base database FIG. 2A is a block diagram illustrating a variety of filters that may be present in the query analysis module 112 for identifying terms for use in the modified query. It should be noted that various embodiments of the present disclosure may have different filters present and not all of the filters are required. A developer has the ability to pick and choose which of the filters illustrated in FIG. 2A are applicable or usable by the indexing system. As such any number or combinations of the filters may be present.

FIG. 2A is a block diagram illustrating the various filters that can be present in the query analysis module 112 and may be used by the system in the process of generating the token index for the article. Query analysis module 112 may include a tokenizer 210, a camel case filter 220, a value type filter 230, a named-entity filter 240, a stop filter 250, a lower case filter 260, a synonym filter 270, a second synonym filter 280, and a stem filter 290.

Figure 2B:
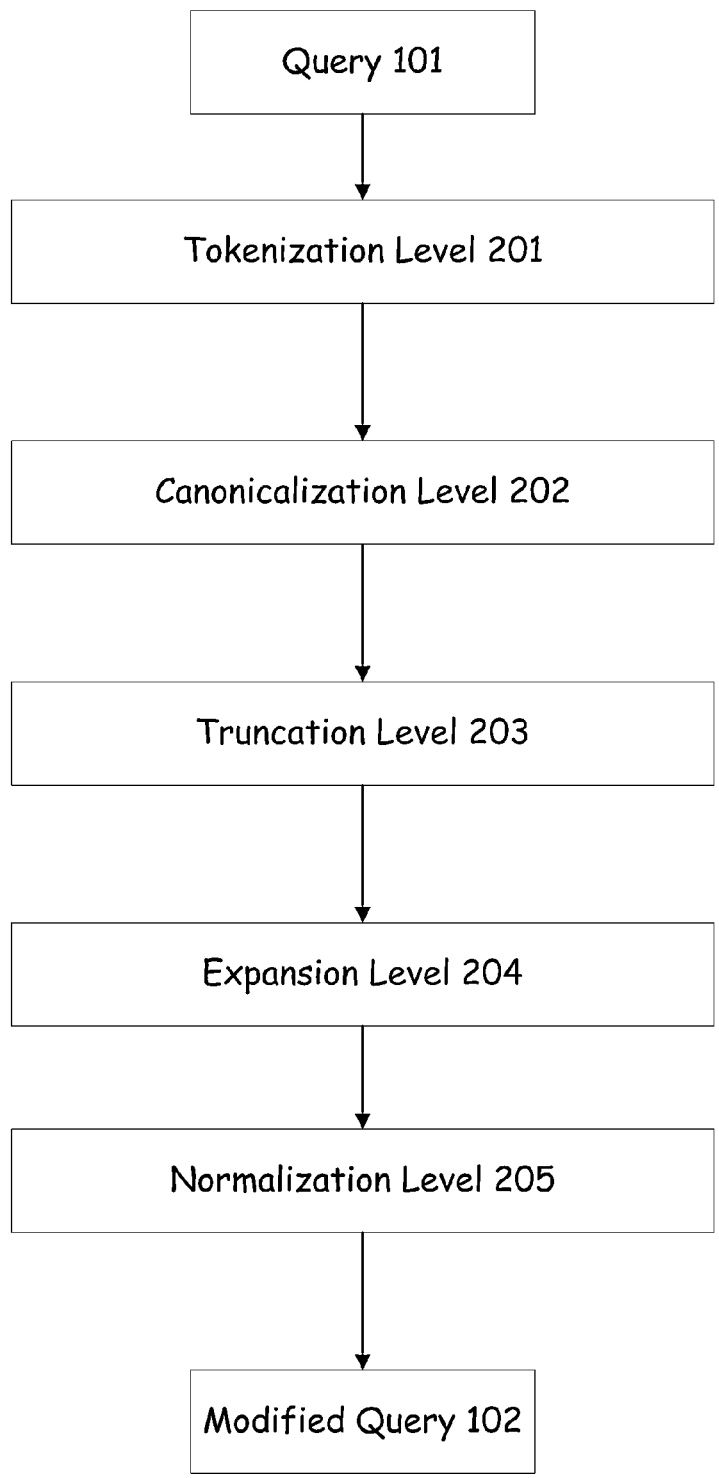
FIG. 2B is a block diagram illustrating an organization of the filters of FIG. 2A according to a basic functionality of the filters according to one illustrative embodiment.

FIG. 2B is a block diagram illustrating an organization of the filters 210-290 according to a secondary approach to the application of the filters to the query according to one illustrative embodiment. At the first level 201 the query is tokenized using the tokenizer 210. At the next level 202 is the canonicalization of the query. At level 202 filters 220, 230 and 240 are grouped. However it should be noted that other types of filters which provide canonicalization may also be present at this level. At level 203 is the truncation of the query. Level 203 includes the stop word filter 250. However, any other filters may be applied in this level that results in the reduction in the overall size of the query by removing or combining tokens in the query. At level 204 is the expansion level. This level includes filters for the named-entity 240, first synonym filter 270 and second synonym filter 280. However, other filters which expand the query terms by including additional information based on the information in the query may also be present at this level. The final level 205 is the normalization level. At this level the stem filter 290 is located. However, any other filter that can normalize terms in the query may be present at this level as well. The discussion now returns to FIG. 2A to discuss the features of the various filters in the query analysis module 112. Again note that any number of these filters may be present in any logical sequence in the query analysis module 112.

Tokenizer 210 takes the query and converts the plain text in to smaller atomic units that will be processed further to generate the modified version of query 101 to find matching documents in the knowledge base database. The tokenization process typically occurs at the word level in the query. However, it is often difficult for a system to know what a word actually is. As such, the tokenizer 210 in some embodiments employs heuristics to identify the words in the query to be tokenized. The heuristics can include tokenizing at each encountered white space between characters as well as considering all of the encountered punctuation in the query.

Camel case filter 220 is configured to identify within the tokens that are generated by the tokenizer 210 various "camel-case words." Camel case filter 210 expands camel cased words into their constituent words. Camel case words are words that appear in technical documents that often have two or three words combined into a single word. In one embodiment of the present disclosure, the camel case filter 210 considers and identifies the following five common cases of camel case words: (1) the standard case 'CamelCase' is often used for type names ad references in source code or configuration entities e.g., GetMethodName; (2) the interior case 'camelCase' is often used for identifier names e.g., methodName; (3) capital letters at the end 'CamelCASE' e.g., GetBIT, (4) all capital letters 'CAMELCASE' are often used in abbreviations or boolean bits e.g., ENABLED; and (5) a mixture of camel case and capital letters are often used to include abbreviations inside the word e.g., WeakRSAKeys. Given an input camel case word, this filter 210 outputs the original token along with its constituent words. For instance, 'IsSecurityLogOverwrite' will be converted into [IsSecurityLogOverwrite, Is, Security, Log, Overwrite] to support queries that look for the camel-cased representation or its constituent words. However, other instances of camel case words can be identified and processed by the camel case filter.

Value type filter 220 is configured to identify from the tokens the value type associated with a token to provide further hints related to encountered numbers. This typically occurs in articles that discuss certain software versions or specific system set ups. For example an article may state "In SQL, if the number of logical processors is less than or equal to 8, set the InMemory bit to true . . . ." The value type filter 220 adds to the query 101 a token for Numeric or Boolean at the same position in the token stream as the identified value token. Thus, the value type filter 220 detects numerals, true/false and version numbers. Additional values such as Enumerations may also be detected and identified by the value type filter 220. Thus, in the example the value type filter 220 would output "In SQL, if the number of logical processors is less than or equal to 8 NUMERIC, set the InMemory bit to true BOOLEAN . . . ."

Lower case filter 260 is a filter that simply outputs a lower cased version of an identified token. Thus, in the example "SQL" is converted to a second token "sql" which is then added to the list of tokens for the article. It should be noted that when the lower case filter is present along with the camel case filter 210, the camel case filter 210 should be applied before the lower case filter 260. This allows for the preservation of the information associated with a camel case word that would be lost and expansion of the camel case word becomes difficult at best.

Stop word filter 250 is applied to the query 101 to remove frequently occurring common words in the natural language from the query. In one embodiment stop word filter 250 uses a list of the most frequently occurring words in the language which the documents have been indexed against. For example in English words such as "a" "an" "and" "the" "is" "are" "my" "our" etc. will be removed from the query. Additionally certain words that are common in the subject matter of the knowledge base may also be removed. This list of words could be provided to the system from a developer or organization that helps identify words that typically would not be removed, but because of the subject matter may create more noise than providing value to a person looking for the information.

Named entity filter 240 is a filter that is configured to identify named-entities in the query. For example if the document states "Install SQL Server on your machine." It becomes helpful to identify and recognize that "SQL Server" is a named entity and not two separate unrelated words. The named entity filter 240 modifies the token order information of the query so that the words "SQL Server" are identified as a single token and not as two separate tokens.

The named entity filter 240 obtains a list of named entities from a domain expert where the named entities have been mapped to an ontology model to identify other features that are common to the named entities. For example "SQL Server" and "logical processors" may be tagged as "Software Entity" in the ontology model. This list of named entities may also be created automatically or automatically in conjunction with a domain expert.

Given the list of named-entities, the named-entity filter 240 in one embodiment builds a graph as a pre-processing step to enable fast lookups. In this graph, nodes denote words and edges connect words if they occur together in a phrase in the named-entity list. For instance, given the words [sql, sql server, sql server database, sql server 2005], the final graph will contain four nodes (sql, server, database, 2005), an edge from sql→server, server→database, and server→2005.

Table 1 (below) shows how named entities are recognized at query-time and is implemented as part of the Named-Entity Filter. For each input token, its position is recorded in TokenPosition (L4). The ExistsAsEntity function on L5 is used to check if the token exists as an entity i.e., whether the graph consists of a node having TOKEN as its value. If it does, then a check is made (using ExistsAsNeigbor function in L11) to see if the next token (L10) exists as a neighbor of TOKEN in the graph. If it does, then it is concatenated with the previous token and pushed onto a stack. The algorithm will continue to execute as long as the next token exists as a neighbor of the previous token. Once this condition is violated, the stack is popped and the concatenated string will be given the token position of TokenPosition from L4.

TABLE 1

Query-time Named-Entity Recognition

Require: Pre-processed database of word automatons, Token stream
Output: Group of tokens recognized as named-entities
 1: Initially:
 2: TOKEN ←Current token
 3: STACK ←InitializeStack( )
 4: TokenPosition = GetTokenPosition( )
 5: while ExistsAsEntity(TOKEN) do
 6: CurrentTerm = TOKEN
 7: if IsEmpty(STACK) == 1 then
 8: STACK.Push(CurrentTerm)
 9: end if
10: NextTerm = IncrementToken( )
11: if ExistsAsNeigbor(CurrentTerm,NextTerm) == 1 then TABLE 1-continued Query-time Named-Entity Recognition 12: CurrentTerm = STACK.Pop( )
13: STACK.Push(CurrentTerm+NextTerm)
14: else
15: NextTermBu f f er = NextTerm
16: end if
17: end while
18: STACK.Pop( )
19: TOKEN.SetPosition(TokenPosition Synonym filter 270 is a filter that is applied to the token stream to identify words or synonyms in the query that could be related to the words on a domain specific level. The filter 270 expands the token stream when it finds words that are related. This filter 270 is used in situations where the index is known not to be indexed or in situations where the index was likely is not indexed using synonyms. This permits the use of the present disclosure with systems that were not originally designed for this type of searching. The synonym filter 270 works similar to the way that name-entity filter 240 works, and the synonym filter is illustrated in Table 2 below. However, instead of using the graph of the named entity filter 240 the synonym filter uses two hash tables. The first has table contains words as keys and their associated synonym group identifier as the value. The second hash contains the synonym group identifiers as keys and the set of all synonyms in that group as values. When the synonym filter 270 identifies a token in the query string it injects all synonyms in that group as values. However, in other embodiments additional logic may be employed to filter out those synonyms that are not relevant to the document. The synonyms are then inserted into the token stream at the positional value of the identified token.

TABLE 2

Query-time Synonym Expansion

Require: Synonym groups, Token stream
Output: Token stream injected with associated synonyms
 1: Initially:
 2: TOKEN ←Current token
 3: STACK ←InitializeStack( )
 4: if HasSynonyms(TOKEN) == 1 then
 5: STACK.Push(GetSynonyms(TOKEN))
 6: TokenPosition = GetTokenPosition( )
 7: end if
 8: while STACK is not empty do
 9: In jectNewToken(STACK.Pop( ),TokenPosition)
10: end while Second synonym filter 280 is a filter that is configured to take the token stream and add to the string common synonyms for words in the token stream. In one embodiment the second synonym filter makes use of the WordNet, G. A. Miller's Wordnet: a Lexical Database for English. Communications of the ACM, 38(11):39-41, 1995, for identifying additional words to be added to the string as synonyms. However, any list of synonyms for the language in question can be used for this expansion of terms. These identified synonyms are then added to the query string in the positional location of their corresponding token. Again this filter 280 is used in situations where the index was generated or believed to have been generated without the incorporation of synonyms into the index.

The stem filter 290 is a filter that is configured to remove or convert words to their base forms. As such the stem filter 290 is employed to return the work back to its base form. For example, an article describing "upgrading your software" and an article about "upgradation of a software module" are both likely to represent the same concept, that is "upgrade". The stem filter in one embodiment employs the Porter stemming algorithm. The Porter stemming algorithm is a process for removing the more common morphological and inflexional endings words. However, any method for identifying and stemming words can be used. The final query 101 is output to the query fuzzing module 114.

Returning back to FIG. 1, the query fuzzing module 114 is configured to construct a power set of terms in the input query 101 that facilitates approximate searches so that documents may be matched that only contain a subset of the terms from the input query as opposed to the complete input query. For many queries, using exact keywords may not return a result. For instance, a naive search for an input query "LSA Crash On Audit Fail Flag" would return only documents containing all the terms from the input query but it will not return documents where, for instance, the word "flag" is missing. As such the query fuzzing module 114 constructs approximate queries from the original query 101.

For an input query such as "ErrorID 823", an exact search or even an approximate search may not return documents containing the text "the errorId was logged to be 823" due to the presence of additional words between the terms from the input query. In such scenarios, it useful to do relaxed queries that allow for other terms to appear in between the input query terms. Query distributor module 116 address this issue by modularizing the matching logic. In one illustrative embodiment the query distributor module 116 is configured to perform a parallel invocation of different matchers in the matching engine 120 (e.g., exact matching, proximity matching) and finally aggregates the results.

To perform automatic retrieval, one question that arises is how to establish a relationship between individual configuration parameters inside a snapshot and the knowledge base articles when the query is based off of a configuration snapshot. In particular, given a key-value pair with a constraint, it is desirable to retrieve all knowledge base articles that satisfy the truth condition. For instance, given a key value pair of "NumOfLogicalProcessors,7", it is desired to retrieve all knowledge base articles where the user sets the number of logical processors to 7. However, there are numerous challenges associated with such a retrieval. First, knowledge base articles are written in natural text so a mapping should be made from NumOfLogicalProcessors to candidate natural language text such as "ensure that the logical processors are set to 7". Second, the value being searched for may not even be present in the knowledge base article e.g., "the number of logical processors is less than 8" has no 7 but still satisfies the constraint.

In order to achieve this result the matching engine 120 is configured in one embodiment to implement two types of matchers, an exact matcher 121 and a proximity matcher 123. However, other types of matchers may be present in matching engine 120. These matchers may perform different types of document matching or may simply invoke execution using different guidelines of the existing matchers. In some embodiments the matching engine 120 may distribute the various matchers across multiple different machines.

When matching engine is implementing an exact match, it is implementing a naive search mechanism that looks for documents in the knowledge base database 140 that contain the key-value pairs in their exact form. When the matching engine 120 is implementing a proximity match it is implementing proximity based approximate matching along with a constraint evaluation module as a mechanism to find two tokens within a given proximity of one another that satisfy a constraint (if any). Proximity matching is executed in two stages according to one embodiment.

The first stage is the retrieval stage. For an input query 101, the matching engine 120 not only retrieves the relevant documents but also tracks the positions of every term occurrence that matches from the index. An additional pruning stage removes all matches which are beyond a specified distance. For instance, given a constraint such as "logical,processors,Distance=1", only documents containing "logical" and "processors" next to each other are retrieved. Subsequently, all words between the matched positional offsets are obtained from the index.

The second stage is the constraint evaluation stage. Once the relevant documents are retrieved along with the set of words between the matched positions of the input query terms, the matching engine 120 performs an on-the-fly truth condition evaluation. First, each match is passed through a token extractor module 122 which extracts any comparative expressions in natural text (e.g., less than or equal to, set to, greater than) along with any surrounding values (e.g., numerical, Boolean, floating point etc.). Second, the extracted tokens and surrounding values are passed through an abstract syntax tree constructor 124. The abstract syntax tree construction constructs an abstract syntax tree (AST) for individual expressions to be evaluated. Recall from the query analysis phase that any values found in the input query are abstracted by the value type filter and substituted with a generic type. Therefore, the abstract syntax tree will be constructed with the operator as the root node and the operands (value extracted from the query and value from the retrieved document) as the leaf nodes. Third, the abstract syntax trees are compiled in-memory and evaluated to obtain the truth condition through the use of a constraint evaluator 126. Only matches satisfying the specified condition (e.g., truth condition) are returned for subsequent ranking by the ranking engine 130.

Ranking engine 130 is configured to score and rank candidate knowledge base articles that have been retrieved by the matching engine 120. The score of a knowledge base article depends on the matcher that retrieved the knowledge base article. Because there can be multiple matchers, ranking happens at multiple stages:

Ranking engine 130 in one embodiment uses a slightly modified variant of the standard tf-idf (term frequency-inverse document frequency) to score the retrieved results from an exact match. In tf-idf, each of the terms in a document is associated with the number of times it occurs in that document. Terms are then weighted according to how common they are across the corpus, the intuition being that rare terms are more central to the meaning of a document than the terms that occur regularly. The score S(q,d) of a document d for a query q is calculated as:

$$S_{exact}(q,d) = c(q,d)F(q)\Sigma_{t \in q} tf(d) idf(t^2) \quad \text{Equation (1)}$$

where c(q,d) is the normalized ratio of the number of query terms from q found in the document d and the total number of terms in the query q. Therefore, presence of all query terms in a given document will increase this ratio and vice versa. As some of the results are based on fuzzed queries, the hits from "fuzzed" queries typically receive a lower score compared to those from the original query. Therefore, the ranking engine 130 employs in one embodiment a fuzz factor F(q) to take this into consideration. F(q) is defined as the inverse of the distance between the fuzzed query q and the original query q where distance is defined as the number of terms that need to be added to q to get q. To prevent zeroes in the denominator, the ranking engine 130 applies in one embodiment a Laplace correction by adding 1 to the denominator. t f(d) is the frequency of the term tin document d. Therefore, documents having more occurrences of a given term receive a higher score. Finally, id f(t) or inverse document frequency is a measure of whether the term is common or rare across all documents and is obtained by taking the ratio of the total number of documents D and the number of documents containing the term:

$$idf(t) = 1 + \log\left(\frac{|D|}{d \in D : t \in d}\right) \quad \text{Equation (2)}$$

The ranking engine 130 scores a result from a proximity match by considering the maximum allowable positional distance between terms. Intuitively, the score should be inversely proportional to the positional distance between terms i.e., larger the distance between the matched terms smaller the assigned score. In one embodiment the ranking engine 130 computes the score for a proximity match as:

$$S_{prox}(q, d) = c(q, d) \cdot F(q) \cdot \frac{1}{\sqrt{\sum_{t \in q} idf(t)^2}} \sum_{t \in q} idf(t) \frac{L_{avg}(d)}{L(d)} \quad \text{Equation (3)}$$

where c(q,d) is the normalized ratio of the number of query terms from q found in the document d and the total number of terms in the query q. Lavg is the average length of a document and L(d) is the length of document d. F(q) is the fuzz factor as before computed as $$\frac{1}{D_1 + D_2}$$

where $D_1$ is the distance of the query q' from the original query q, and $D_2$ is the number of positional moves in the query q' required to reconstruct q. For example, consider the case when q=q'="Crash On Audit". As q=q', there is no fuzzing and hence $D_1$=0. If the matched document was "Audit flag had the crash bit" then $D_2$=5 because it takes 4 positional moves to move "crash" to the location of "Audit" and then 1 positional move to move "Audit" to the next location giving the final fuzz factor of 15.

Aggregation of results from multiple matchers returned by the matching engine 120 is then conducted by the ranking engine 130. The ranking engine 130 builds a final result set by aggregating the results from individual matchers. In one embodiment a simple linear aggregation with weighted ranking is used and may be expressed by the following equation.

$$S(q,d) = \Sigma_{x \in n} w_x M_X \quad \text{Equation (4)}$$

where $w_x$ is the weight assigned to the matcher $M_x$ and n is the total number of matchers implemented as in this embodiment n=2. As the exact matcher should be given a higher score, the ranking engine 130 assign $w_{exact}$=1.0 and $w_{proximity}$=0.25. The results of this aggregation are output to the user so that the user can access the identified knowledge base articles.

Knowledge base 140 is in one embodiment a database or other data repository that stores articles or documents along-with any associated meta-data or index related to a specified knowledge base. For example, the knowledge base 140 may contain a plurality of articles related to a specific computer software product, such as SQL Server or Microsoft Word, a computing system in general, or any other topic where knowledge based articles and documents may be produced or consumed. In some embodiments knowledge base 140 may hold knowledge based articles for multiple different topics or related to many different products. The documents held in the knowledge base 140 are indexed in such a way as to allow the documents to be accessed quickly by the matching engine 120.

Figure 3:
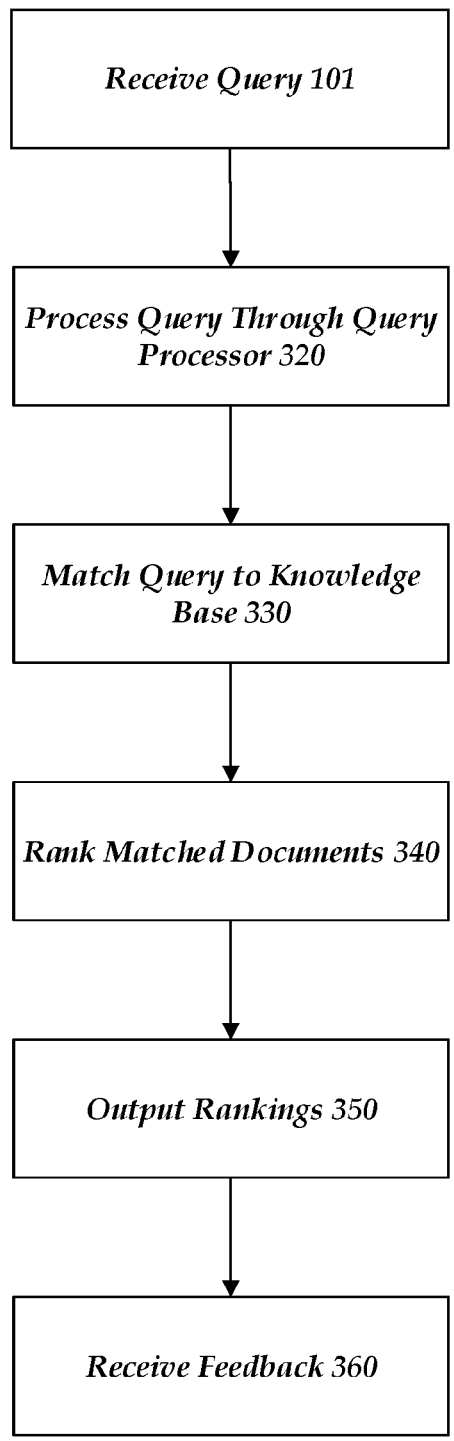
FIG. 3 is a flow diagram illustrating the process of searching for documents using the modified query according to one illustrative embodiment.

FIG. 3 is a flow diagram illustrating the steps executed by the query processing system 100 according to one illustrative embodiment.

A query 101 is received at the query processing system at step 310. The query 101 can be any query that the user has provided to the system such as a configuration or software error the user noticed, some description of a problem the user is having, etc. In some embodiments the query 101 may be a configuration snapshot taken of the system that is either automatically provided to the query processing system 100 or manually provided by the user.

The query processing system then takes the received query 101 and processes the query through the query processor 110. This is illustrated at step 320. The query processor in one embodiment converts the query into tokens and passes the token stream of the query through a query analysis module that expands the query terms by rewriting the query and substituting any value-types it finds. The query processor 110 may then fuzz the query. Further the query processor 110 may invoke logic that causes different matching processes to later be invoked by the matching engine. This modified query is provided to the matching engine 120.

In some embodiments the query processing of step 320 may first look to a caching layer that includes previous queries and their results in a cached format. If a hit for the provided query is found in the cache 111, the corresponding results are retrieved without any further processing required and the process advances to step 350. If there is no matching query in the cache the process continues on to step 330.

Figure 4:
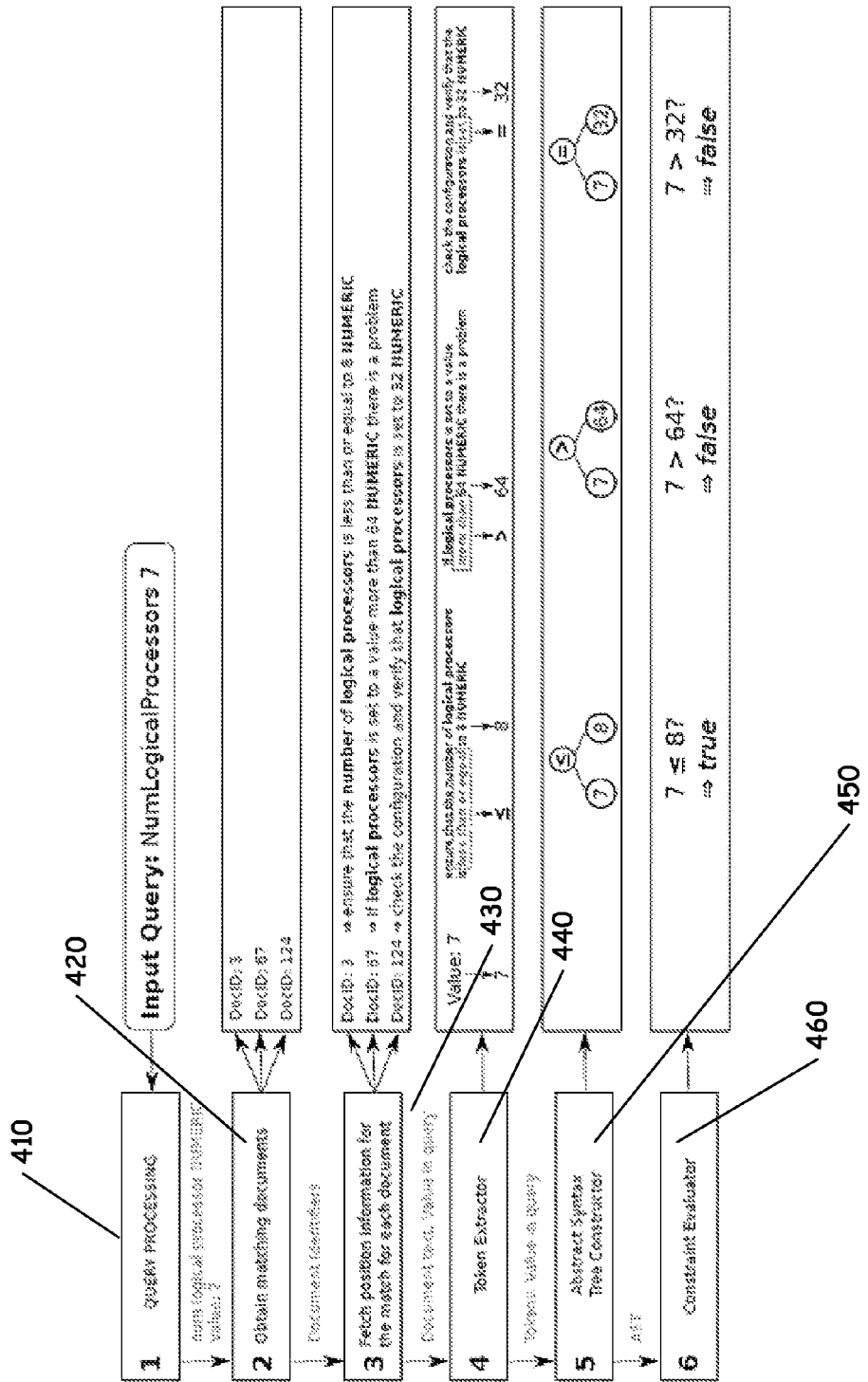
FIG. 4 is a flow diagram illustrating the process executed by the matching engine according to one illustrative embodiment.

The matching engine 120 takes the modified query and proceeds to identify documents in the knowledge base 140 that match the terms in modified query. This is illustrated at step 330. The matching engine 120 may invoke one or more of the matchers. FIG. 4 is a flow diagram illustrating the process executed by the matching engine 120 according to one illustrative embodiment.

At step 410 the query processing has returned a modified version of the query to the matching engine 120. In this example the query has been converted from NumLogicalProcessors 7 to num logical processors NUMERIC Value 7.

At step 420 the modified version of the query is used by the matchers in the matching engine to identify documents in the knowledge base 140 that match the modified query. In this example DocIDs 3, 67 and 124 are found to match the input term without concern for the actual value that is associated with the numeric value in the query.

At step 430 the position of each term in the documents is fetched for the matched documents. The portion of the text that caused the document to be returned is then passed to the token extractor 122.

At step 440 the token extractor 122 identifies in the documents tokens that give meaning to the numeric values that caused the match to occur. The token extraction 122 further captures the actual value associated with the numeric indication in the index for the documents. The token extractor 122 may use logic to convert text in the documents into mathematical expressions or understandings that may assist in determining if the document is a true match or is actually relevant to the inputted query. In this example the token extractor 122 has determined the meaning of "less than or equal" "greater than" and "set".

At step 450 the tokens and values obtained by the token extractor 122 are passed to the abstract syntax tree constructor. At this stage the abstract syntax tree constructor 124 builds and abstract syntax tree for each of the matched documents. In this example the tree built showing the values found in relationship to the extracted tokens giving meaning to the words.

At step 460 the constraint evaluator 126 takes the abstract syntax tree and resolves each of the trees to determine if the tree is true or false. If the tree is true then the results are output from the matching engine 120 at step 470. If the tree is false then that result is not output by the matching engine.

Ranking engine 130 receives from the matching engine 120 the documents found in the knowledge base and ranks the documents in order of relevance. This is illustrated at step 340. The ranking engine may employ different ranking or scoring equations in determining how to rank a document that was retrieved. Different matching methods may be given higher or lower scores by the ranking engine 130.

The results of the scoring are output to the user at step 350. In some embodiments documents who have a calculated score below a threshold number may be excluded from the results that are displayed. In other embodiments x (e.g., top-3) number of documents will be returned to the user regardless of the number of documents that were returned.

In some embodiments an optional feedback step 360 may be provided. The feedback is where the user or person who submitted the query to the system may provide information back to the system regarding the results that were provided. This feedback may include identification of terms in the query that should have been considered a named-entity or identification of articles that are more relevant than other in answering the query. This information is fed back to the query analyzer 110, the matching engine 120 and the ranking engine 130 so that their respective logics may be updated with this information. The analyzer 110, matching engine 120 and ranking engine 130 update themselves using any known method for incorporating feedback into their logic.

Figure 5:
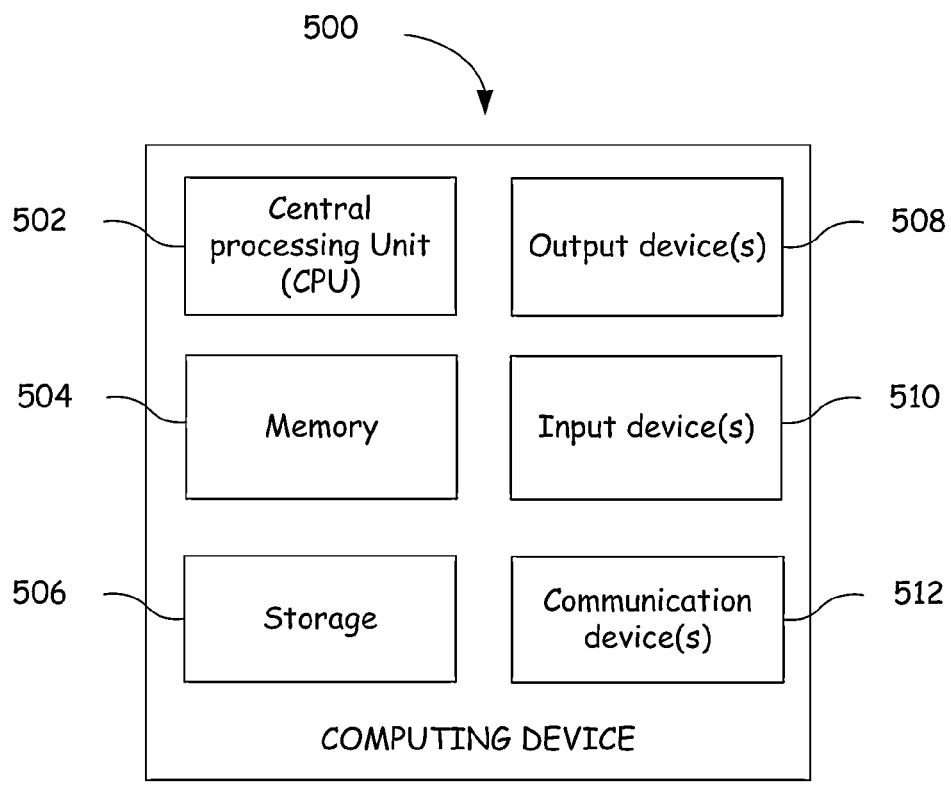
FIG. 5 is a block diagram illustrating a computing device which can implement the querying system according to one embodiment.

FIG. 5 illustrates a component diagram of a computing device according to one embodiment. The computing device 500 can be utilized to implement one or more computing devices, computer processes, or software modules described herein. In one example, the computing device 500 can be utilized to process calculations, execute instructions, receive and transmit digital signals. In another example, the computing device 500 can be utilized to process calculations, execute instructions, receive and transmit digital signals, receive and transmit search queries, and hypertext, compile computer code, as required by the system of the present embodiments. Further, computing device 500 can be a distributed computing device where components of computing device 500 are located on different computing devices that are connected to each other through network or other forms of connections. Additionally, computing device 500 can be a cloud based computing device.

The computing device 500 can be any general or special purpose computer now known or to become known capable of performing the steps and/or performing the functions described herein, either in software, hardware, firmware, or a combination thereof.

In its most basic configuration, computing device 500 typically includes at least one central processing unit (CPU) or processor 502 and memory 504. Depending on the exact configuration and type of computing device, memory 504 may be volatile (such as RAM), non-volatile (such as ROM, flash memory, etc.) or some combination of the two. Additionally, computing device 500 may also have additional features/functionality. For example, computing device 500 may include multiple CPU's. The described methods may be executed in any manner by any processing unit in computing device 500. For example, the described process may be executed by both multiple CPU's in parallel.

Computing device 500 may also include additional storage (removable and/or non-removable) including, but not limited to, magnetic or optical disks or tape. Such additional storage is illustrated in FIG. 5 by storage 506. Computer storage media includes volatile and nonvolatile, removable and non-removable media implemented in any method or technology for storage of information such as computer readable instructions, data structures, program modules or other data. Memory 504 and storage 506 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 500. Any such computer storage media may be part of computing device 500.

Computing device 500 may also contain communications device(s) 512 that allow the device to communicate with other devices. Communications device(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 500 may also have input device(s) 510 such as keyboard, mouse, pen, voice input device, touch input device, etc. Output device(s) 508 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A system for processing a query comprising:
one or more processors;
a memory containing executable instructions which, when executed by the one or more processors, cause the computer system to be configured with an architecture that performs a computer-implemented method which comprises:
receiving a query that comprises a plurality of terms including at least a camel case term and a value type term;
modifying the camel case term into a constituent term;
modifying the value type term into a generic term;
converting the query into a modified query modified to have the constituent term at a position corresponding to the camel case term, and modified to have the generic term at a position corresponding to the value type term;
based on the modified query identifying one or more documents by proximately matching documents in the knowledge base database having an index that approximately matches the modified query;
for each identified document, determining a distance for one or more terms in the modified query;
removing from the identified documents any documents which contain any of the one or more terms that have a distance that exceeds a predetermined distance;
applying a scoring formula to the identified documents to obtain a score for each of the identified documents, and then ranking the identified documents according to the score obtained for each document; and
outputting the ranked documents to a user for selection.

2. The system of claim 1 wherein a constraint evaluation is performed on the one or more identified documents.

3. The system of claim 2 wherein comparative expressions are extracted from natural language text in one or more of the identified documents and any values surrounding the comparative expressions.

4. The system of claim 3 wherein an abstract syntax tree is generated for each comparative expression in the one or more identified documents and a corresponding term in the modified query.

5. The system of claim 4 wherein a constraint is used to evaluate each abstract syntax tree to determine whether the abstract syntax tree is a true statement or a false statement, and wherein those identified documents associated with an abstract syntax tree that is a false statement are differentiated from identified documents not associated with an abstract tree that is a false statement.

6. The system of claim 1 wherein the query is modified by applying a first synonym filter to the query that identifies a term in the query that is related to a group of words on a domain specific level and inserts the group of words into the query at a position in the query corresponding to the identified term.

7. The system of claim 1 wherein the query is modified by applying a named entity filter to the query that identifies two or more terms in the query that are related to each other and combines the two or more terms into a single term in the query.

8. The system of claim 1 wherein a power set of terms is constructed from the query to facilitate approximate matching of documents in the knowledge base database.

9. The system of claim 1 wherein the one or more documents are identified by proximately matching documents in the knowledge base database after in indication is provided that a relaxed query is to be permitted on the modified query.

10. A computer-implemented method for querying a knowledge based database having documents that have been indexed, the computer-implemented method being performed by one or more processors, and the computer-implemented method comprising:
receiving a query, the query containing a plurality of terms comprising at least a camel case term and a value type term;
processing the query to obtain a modified query, the modified query including a constituent term at a position corresponding to the camel case term, and a generic term at a position corresponding to the value type term;
identifying documents in a knowledge base database that proximately match the modified query;
for each identified document, determining a distance for the one or more terms in the modified query;
removing from the identified documents any documents which contain any of the one or more terms that have a distance that exceeds a predetermined distance;
applying a scoring formula to the identified documents to obtain a score for each of the identified documents;
ranking the identified documents based on the score obtained for each of the identified documents; and
outputting the identified documents according to the ranking.

11. The method of claim 10 wherein the received query is based on a configuration snapshot of a computing system.

12. The method of claim 10 wherein identifying documents in the knowledge base database further comprises identifying documents that exactly match the modified query.

13. The method of claim 12 further comprising:
determining a truth condition for those identified documents that proximately match the modified query; and
differentiating identified documents that fail the determined truth condition.

14. The method of claim 10 further comprising:
determining that the received query exists in a cache of preexisting queries; and
outputting a ranking of documents for the query from the cache when the query exists in the cache.

15. A computer readable storage medium having computer executable instructions that when executed by one or more processors cause one or more computers to:
receive at least one query, the at least one query having a plurality of terms including at least one camel case term and at least one value type term;
process the at least one query to modify the at least one camel case term into its constituent terms;
process the at least one query to modify the at least one value type term into a generic term;
store the at least one value type term in memory;
create at least one modified query the at least one modified query modified to have the constituent terms at a position corresponding to the camel case term and the generic term at a position corresponding to the value type term;

identify a plurality of documents in a knowledge base database that at least proximately match the at least one modified query;
determine a distance for each term in the modified query in the plurality of documents;
remove from the plurality of documents any documents wherein the distance exceeds a predetermined distance;
apply a scoring formula to the plurality of documents to obtain a score for each of the plurality of documents; and
rank the plurality of documents according to the obtained score.

16. The computer readable storage medium of claim 15 wherein the received query is based on a configuration snapshot of a computing system.

17. The computer readable storage medium of claim 15 wherein identifying documents in the knowledge base database further comprises identifying documents that exactly match the modified query.

18. The computer readable storage medium of claim 17, wherein the computer executable instructions executed by the one or more processors cause the one or more computers to further perform the following:
determine a truth condition for those identified documents that proximately match the modified query; and
differentiate identified documents that fail the determined truth condition.

19. The computer readable storage medium of claim 15, wherein the computer executable instructions executed by the one or more processors cause the one or more computers to further perform the following:
determine that the received query exists in a cache of preexisting queries; and
output a ranking of documents for the query from the cache when the query exists in the cache.

20. The computer readable storage medium of claim 15 wherein the query is further modified by applying a named entity filter to the query that identifies two or more terms in the query that are related to each other and combines the two or more terms into a single term in the query.

* * * * *